(12) United States Patent
Tao et al.

(10) Patent No.: US 9,210,757 B2
(45) Date of Patent: Dec. 8, 2015

(54) LED LIGHT SOURCE

(75) Inventors: Haimin Tao, Eindhoven (NL); Henricus Marius Joseph Maria Kahlman, Dongen (NL); Pieter Gerrit Blanken, Nuenen (NL); Ralph Kurt, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 185 days.

(21) Appl. No.: 14/124,743

(22) PCT Filed: May 30, 2012

(86) PCT No.: PCT/IB2012/052687
§ 371 (c)(1),
(2), (4) Date: Dec. 9, 2013

(87) PCT Pub. No.: WO2012/168827
PCT Pub. Date: Dec. 13, 2012

(65) Prior Publication Data
US 2014/0103825 A1 Apr. 17, 2014

(30) Foreign Application Priority Data
Jun. 10, 2011 (EP) .................................... 11169498

(51) Int. Cl.
H05B 37/00 (2006.01)
H05B 33/08 (2006.01)

(52) U.S. Cl.
CPC .......... *H05B 33/0845* (2013.01); *H05B 33/083* (2013.01); *H05B 33/0812* (2013.01); *H05B 33/0815* (2013.01); *Y02B 20/347* (2013.01); *Y02B 20/348* (2013.01)

(58) Field of Classification Search
CPC ........ H05B 37/00; H05B 37/02; H05B 37/04; H05B 39/04
See application file for complete search history.

(56) References Cited

U.S. PATENT DOCUMENTS

| | | | |
|---|---|---|---|
| 7,081,722 B1 | 7/2006 | Huynh et al. | |
| 9,030,107 B2 * | 5/2015 | Ido | 315/186 |
| 2004/0233145 A1 | 11/2004 | Chiang | |
| 2010/0308738 A1 | 12/2010 | Shteynberg et al. | |

* cited by examiner

*Primary Examiner* — Hai L Nguyen
(74) *Attorney, Agent, or Firm* — Yuliya Mathis

(57) ABSTRACT

A string of LED loads is supplied by means of a rectified mains voltage. A cathode of each LED load is coupled to ground by means of a string. The strings are made conductive and non-conductive one by one in dependency of the instantaneous value of the rectified mains using both voltage and current sensing.

10 Claims, 3 Drawing Sheets

LED LIGHT SOURCE

FIELD OF THE INVENTION

The invention relates to a cheap and simple LED light source comprising N LED loads that is directly connectable to a supply source supplying a low frequency AC voltage such as the mains supply.

BACKGROUND OF THE INVENTION

Such a LED light source is known from U.S. Pat. No. 7,081,722 B1. The LED loads are LED arrays comprising series arrangements and possibly parallel arrangements of individual LEDs. The known LED light source comprises a rectifier for rectifying the low frequency AC supply voltage. A series arrangement comprising the N LED loads is connected to output terminals of the rectifier. During operation a periodical DC voltage with an instantaneous value varying between zero Volt and a maximum amplitude is present between the output terminals of the rectifier. The known LED light source is equipped with control means for subsequently making the LED loads conduct a current, one by one and starting with a first LED load that is closest to a first end of the series arrangement, in dependency of the instantaneous value of the low frequency AC supply voltage when the instantaneous value increases and for subsequently making the LED loads stop conducting a current, one by one and starting with the Nth LED load, in dependency of the instantaneous value of the low frequency AC supply voltage when the instantaneous value decreases. These control means typically comprise N control strings, each comprising a transistor and being coupled between the cathode of one of the LED loads and an output terminal of the rectifier.

When the instantaneous value of the periodical DC voltage is zero Volt, all of the transistors comprised in the control strings are conductive but none of the LED loads carries a current. When the instantaneous value of the periodical DC voltage increases, a voltage is reached at which a first LED load and the first transistor comprised in the first control string start conducting a current. Similarly, when the instantaneous value of the periodical DC voltage has increased further to a high enough value, the second LED load and the transistor in the second control string start conducting. In order to minimize power dissipation it is desirable to make sure that the current through the first control string is reduced and preferably stopped.

In the case of a further increase of the instantaneous value of the periodical DC voltage, the remaining LED loads and the transistors comprised in the control strings connected to the cathodes of these LED loads start subsequently to conduct a current. When the nth control string carries a current, the control means ensure that the currents in the first n−1 control strings are reduced or stopped. When all of the LED loads conduct a current, the Nth transistor conducts a current and the instantaneous value of the periodical DC voltage increases further until the maximum amplitude is reached. After that the instantaneous value of the periodical DC voltage starts decreasing. While the instantaneous value decreases the LED loads stop conducting a current one by one in reversed order (first the Nth LED load stops conducting and the first LED load is the last to stop conducting). When the nth LED load stops conducting, the (n−1)th control string starts conducting a current. The nth transistor remains conductive but no longer carries a current or only carries a strongly reduced current. After the first LED load has stopped conducting, all transistors are conductive but none conducts a current, the instantaneous value of the periodical DC voltage decreases further to zero and then the cycle described hereabove is repeated. The known LED light source is very compact and comparatively simple. Furthermore, it can be directly supplied from a low frequency AC supply voltage source such as the European or American mains supply.

Several ways to control the currents in the control strings have been disclosed in the prior art. It is for instance possible to make the nth transistor non-conductive when the voltage across the nth control string is higher than a reference value approximately equal to the forward voltage of the (n+1)th LED load. Another possibility is to make the transistor comprised in the nth control string non-conductive when the instantaneous value of the rectified low frequency AC voltage becomes higher than a reference value approximately equal to the sum of the forward voltages of the first (n+1) LED loads. Both these methods suffer from the drawback that the forward voltages of LED loads that are nominally identical show a certain amount of spread. Consequently overlaps or gaps between the conduction intervals of neighboring control strings occur, causing undesirable current spikes and valleys that also reduce the circuit efficiency.

Still another method is to sense the current through the nth control string and make the first n−1 control strings non-conductive, when this current is higher than a reference level. Said method suffers from the drawback that the sensed current signal may become very weak, when the LED light source is in dimmed operation.

Another possibility, illustrated in FIG. 8 of U.S. Pat. No. 7,081,722 B1, is to place an impedance, preferably a resistor, in series with the transistor in each control string and arrange all the resistors in series between the transistor comprised in the first control string and the second output terminal of the rectifier. Furthermore, the LED light source is equipped with a global current control circuit.

In the case that the transistors are implemented for instance as NPN transistors, all the base electrodes of these transistors are maintained at the same global current control voltage generated by the global current control circuit. As a consequence, when the transistors in two neighboring control strings for instance the first and the second are both conductive, their emitter voltages are nearly identical (both approximately equal the global current control voltage minus 0.7 Volts (the base emitter voltage drop of a conducting transistor)). However, because of small differences in the characteristics of the transistors comprised in the first and second control string and the unequality of the conducted currents, the emitter voltages are not quite identical. Since the resistor comprised in the first control string is connected between these emitters, the voltage drop across this resistor is nearly zero, so that the current through the first control string is also nearly zero. In a similar way it can be derived that when the nth control string conducts a current, the currents through the first n−1 control strings are reduced with respect to the current through the nth string. A drawback of this method is that the current can never be completely pinched off, but can only be reduced. The reduction factor depends on the current in the nth string, the value of the resistor and the difference of the base-emitter voltages of the involved NPN transistors. This is illustrated by way of an example.

Due to the exponential relation between collector current and base-emitter voltage of a bipolar transistor, a ratio between collector currents of 100 corresponds to a base-emitter voltage difference of some 120 mV at room temperature. In the case that the base emitter-voltages of the transistors in the nth control string and the (n−1)th control string differ 120 mV and the current through the nth string is 10 mA the current through the (n−1)th string will be 0.1 mA=100 μA. The resistance value of the resistor arranged in series with the transistor in the (n−1)th string then is 120 mV/0.1 mA=1200 Ohm. When the current through the nth string decreases, e.g. as a result of dimming, to e.g. 3 mA, the ratio of currents changes as the resistor value is fixed. The resulting current through the (n−1)th string then may be some 60 μA and the ratio between the currents is reduced from 100 to approximately 50. These numerical examples show that the (n−1)th string is not completely cut off, but that the current is only reduced with respect to the current in the nth string. Furthermore these examples show that the ratio between the currents in neighboring strings depends on the dim level of the LED light source.

The fact that the currents through the control strings cannot be decreased to zero and that these unwanted currents depend on the dim level is a disadvantage of this way of controlling the currents through the LED loads and the control strings.

Another effect of said way of controlling the currents through the LED loads is that when a next LED load and a next control string start conducting a current, the current through all of the conducting LED loads increases since the number of resistors comprised in the control strings that the current flows through is decreased by 1 and the global current control voltage generated by the global current control circuit is assumed constant. For this reason this way of controlling the currents is referred to as "phase current stacking".

SUMMARY OF THE INVENTION

It is an object of the present invention to provide a LED light source in which the control of the currents through the LED loads is such that gaps and spikes in the current drawn from the power supply as well as light flicker and power dissipation are avoided, also in the case of dimmed operation of the LED light source.

According to an aspect of the invention a string of LED loads is provided, supplied by means of a rectified mains voltage. A cathode of each LED load is coupled to ground by means of a string. The strings are made conductive and non-conductive one by one in dependency of the instantaneous value of the rectified mains using both voltage and current sensing.

According to a further aspect of the present invention a LED light source is provided, comprising
- a first input terminal and a second input terminal for connection to a supply voltage source supplying a low frequency AC supply voltage with frequency f,
- a rectifier coupled to the input terminals for rectifying the low frequency AC supply voltage,
- a series arrangement comprising N LED loads, a first and second end of said series arrangement being coupled to a first output terminal and a second output terminal of the rectifier,
- control circuitry for subsequently making the LED loads conduct a current, one by one, in dependence on the instantaneous value of the low frequency AC supply voltage when the instantaneous value increases and for subsequently making the LED loads stop conducting a current, one by one, in dependence on the instantaneous value of the low frequency AC supply voltage when the instantaneous value decreases, wherein the control circuitry comprises
- N control strings comprising a controllable current regulator and being coupled between the cathode of a LED load and the second output terminal of the rectifier,
- current sensing circuitry for sensing the current in the last N−1 control strings and for decreasing the current in the first n control strings when the (n+1)th control string is conducting current, wherein $1 \leq n \leq N-1$
- N−1 voltage sensing circuits, coupled between the cathode of the (n+1)th LED load and the controllable current regulator comprised in the nth control string, for making the nth control string non-conductive when the voltage across the (n+1)th control string is higher than a reference value, wherein $1 \leq n \leq N-1$,
- a global current control circuit coupled to the controllable current regulators for controlling the instantaneous value of the current through the control strings, wherein the controllable current regulators each comprise a series arrangement of a transistor and at least one impedance and wherein each controllable current regulator comprises an impedance that is not comprised in any of the other current regulators and wherein the global current control circuit and the voltage sensing circuits are coupled to the control electrodes of the transistors comprised in the controllable current regulators.

According to another aspect a corresponding method is provided.

In a LED light source according to the invention, the currents through the LED loads and the control strings are controlled by means of current sensing as well as by means of the voltage sensing circuits. It has been found that the combination of these two control mechanisms provides excellent control of the currents through the control strings over the entire dimming range.

Good results have been obtained for embodiments of a LED light source according to the invention, wherein the impedances in the control strings are comprised in a series arrangement coupled between the transistor comprised in the first control string and the second output terminal of the rectifier. In this way, effective control of the currents through the LED loads and the control strings is possible while the control circuitry is very simple.

Good results have been obtained for embodiments of a LED light source according to the invention, in which the voltage sensing circuits each contain a further switch.

Good results have also been obtained for embodiments of a LED light source according to the invention, in which the current sensing circuitry comprises N−1 current sensing circuits, the nth current sensing circuit being coupled to a common terminal of the transistor and the impedance comprised in the (n+1)th control string and being coupled to control electrodes of the transistors in the first n control strings, and wherein $1 \leq n \leq N-1$. Preferably, further transistors comprised in the voltage sensing circuits form also part of the N−1 current sensing circuits.

In a preferred embodiment of a LED light source according to the invention, the global current control circuit comprises a modulator for modulating the current through the LED loads with a frequency 2f such that the instantaneous value of the current is decreased when the instantaneous value of the low frequency AC supply voltage increases and the instantaneous value of the current is increased when the instantaneous value of the low frequency AC supply voltage decreases. As already pointed out here-above some ways of controlling the current through the LED loads cause the current to increase, when the number of LED loads conducting current increases. In other words, the more LED loads conduct current, the higher this current is. In fact, in order to reduce light flicker, the opposite is required. By means of modulating the current through the LED loads, via the global current control circuit, the current increasing effect of the phase current stacking control can be counteracted.

Dimming of a LED light source according to the invention can for instance be effected by adjusting the voltage present at the control electrodes of the transistors comprised in the control strings via the global current control circuit.

This way of dimming is more in particular effective, in case the LED light source comprises a series arrangement of a switch and a capacitor coupled between the output terminals of the rectifier and control circuitry (VIII) for rendering the switch conductive in case the instantaneous value of the low frequency AC supply voltage drops below a reference value. The capacitor ensures that the supply voltage of the LED loads never drops to zero and that at least part of the LED loads always carry a current. The magnitude of this current can be adjusted by adjusting the voltage present at the control electrodes of the transistors comprised in the control strings via the global current control circuit. More in particular, in case the LED light source is used with a phase cut dimmer, the global current control circuit may comprise circuitry for adjusting the voltage at the control electrodes of the transistors in the controllable current regulators in dependency of the adjusted phase angle of the phase cut dimmer. In this way compatibility of the LED light source with phase cut dimmers is realized in an effective way.

BRIEF DESCRIPTION OF THE DRAWINGS

Embodiments of a LED light source according to the invention will be further discussed with reference to a drawing.

In the drawing.

DETAILED DESCRIPTION OF THE INVENTION

Figure 1:
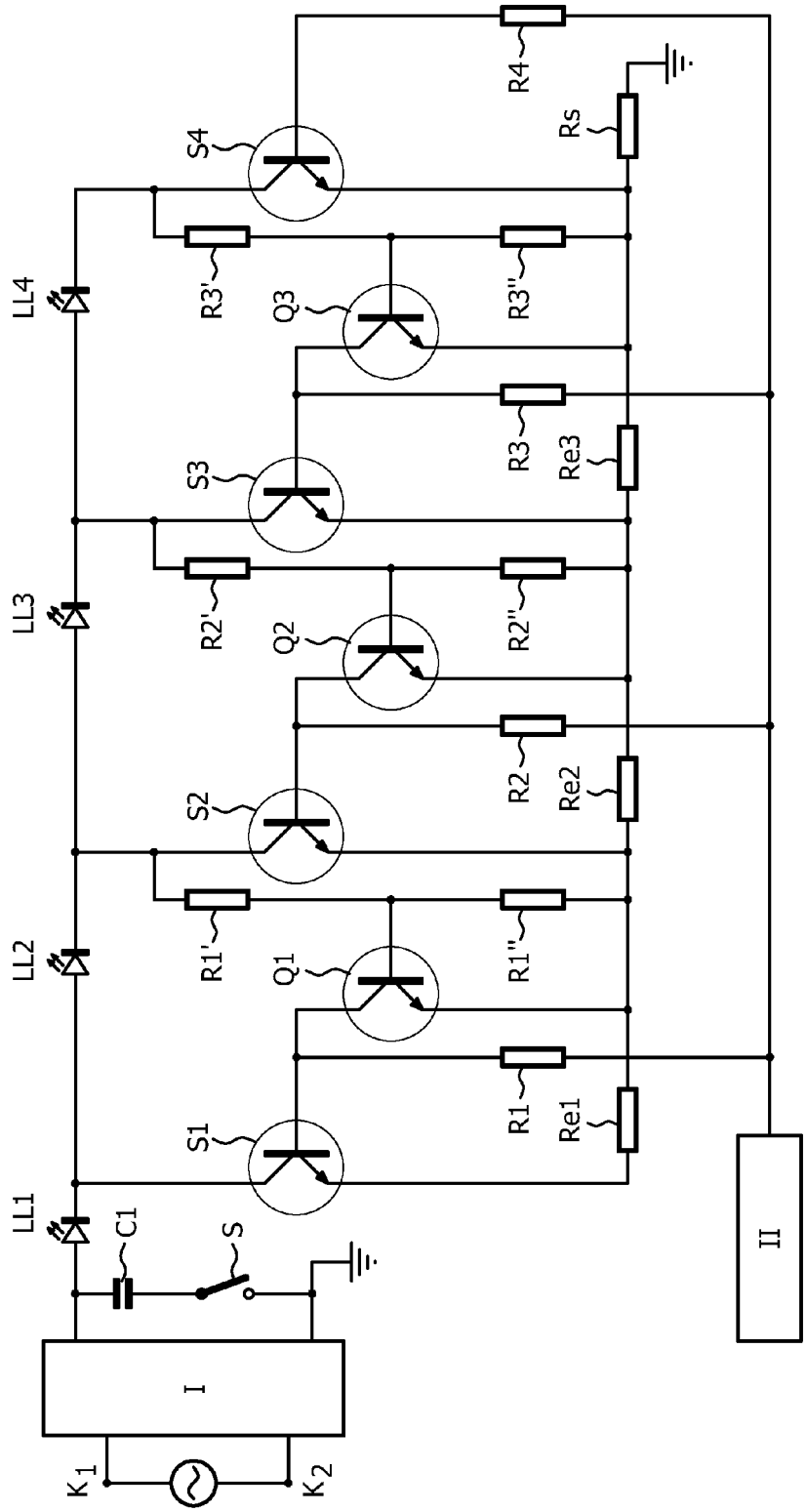
FIG. 1 shows an embodiment of a LED light source according to the invention.

In FIGS. 1, K1 and K2 are respectively a first and a second input terminal for connection to a supply voltage source supplying a low frequency AC supply voltage with frequency f, such as the European or American mains voltage. Circuit part I is a rectifier for rectifying the low frequency AC supply voltage.

Output terminals of the rectifier are connected by means of a series arrangement of a capacitor C1 and a switch S.

LL1, LL2, LL3 and LL4, transistor S4 and resistor Rs together form a series arrangement comprising N LED loads coupled between a first and a second output terminal of the rectifier. Transistor S1 together with resistor Re1 form a first control string. Similarly, transistor S2 and resistor Re2 form a second control string, transistor S3 and resistor Re3 form a third control string, and transistor S4 and resistor Rs form a fourth control string.

The transistors can for instance be unipolar transistors, bipolar transistors, Darlington transistors or MOSFETs. Each of the control strings is coupled between the cathode of a respective LED load and the second output terminal of the rectifier.

The resistors Re1-Re3 together with resistor Rs are comprised in a series arrangement coupled between transistor S1 and the second output terminal of the rectifier. Transistor Q1 together with resistors R1' and R1" form a voltage sensing circuit coupled between a cathode of LED load LL2 and a control electrode of transistor S1. Resistors R1' and R1" form a series arrangement connected between the cathode of LED load LL2 and a common terminal of resistors Re1 and Re2. Transistor Q1 is implemented as a bipolar transistor. The base electrode of Q1 is connected to a common terminal of resistors R1' and R1", while the collector is connected to the control electrode of transistor S1 and the emitter is connected to the common terminal of resistors Re1 and Re2. Similarly, transistor Q2 together with resistors R2' and R2" form a voltage sensing circuit coupled between a cathode of LED load LL3 and a control electrode of transistor S2, and transistor Q3 together with resistors R3' and R3" form a voltage sensing circuit coupled between a cathode of LED load LL4 and a control electrode of the transistor S3.

Circuit part II is a global current control circuit coupled to the control electrodes of transistors S1, S2, S3 and S4 via respectively resistors R1, R2, R3 and R4. The control strings, the voltage sensing circuits and the global current control circuit together form control circuitry for subsequently making the LED loads conduct a current, one by one, in dependence on the instantaneous value of the low frequency AC supply voltage when the instantaneous value increases and for subsequently making the LED loads stop conducting a current, one by one, in dependence on the instantaneous value of the low frequency AC supply voltage when the instantaneous value decreases.

The operation of the LED light source shown in FIG. 1 is as follows. When the input terminals of the rectifier are connected to a supply voltage source that supplies a low frequency AC supply voltage, a rectified AC voltage with a frequency 2 f is present between the output terminals of the rectifier. The switch S is controlled in such a manner that the capacitor C1 is charged when the instantaneous value of the rectified AC voltage is high and that said capacitor serves as a supply voltage source during a "fill in time" when the instantaneous value of the rectified AC voltage is too low to make a single LED load conduct current. The circuitry in this embodiment is dimensioned so that the voltage across the capacitor C1 is high enough to make a current flow through all four LED loads. When the instantaneous value of the rectified AC voltage increases from zero Volt and reaches a value that is higher than the forward voltage of the first LED load LL1, switch S is rendered non-conductive and a current starts to flow through LED load LL1, transistor S1 and the series arrangement of resistors Re1, Re2, Re3 and Rs. The instantaneous value of this current is determined by the voltage present at the control electrode of transistor S1 that is generated by the global current control circuit. A further increase of the instantaneous value of the rectified voltage to a value higher than the sum of the forward voltages of LED loads LL1 and LL2, a current starts flowing through LED loads LL1 and LL2, transistor S2 and the series arrangement of resistors Re2, Re3 and Rs. The voltage at the control electrode of transistor S2 is equal to the voltage at the control electrode of transistor S1 since both these voltages are controlled by the global current control circuit. As pointed out hereabove, when it is assumed that both transistor S1 and transistor S2 are conductive, the voltage at a common terminal of transistor S1 and resistor Re1 is also nearly equal to the voltage at a common terminal of transistor S2 and resistor Re2, since each of these voltages differs from the voltage present at the control electrodes by the voltage across a conducting base/emitter junctions, i.e. by approximately 0.7 Volt. This means that the voltages on either side of resistor Re1 are almost equal and the voltage drop across it is thus almost zero. In other words the current through Re1, and therefore also the current through transistor S1 is strongly reduced. The fact that the voltage across resistor Re1 is not exactly zero is mainly caused by the spread in the characteristics of transistors and the ratio of currents in the strings. For instance the base-emitter voltage drop of S1 and S2 may slightly differ. As explained hereabove the reduction factor further depends on the current in the second control string and the value of Re1.

This mechanism of reducing the current carried by a control string is referred to as "pinching off". This pinching off prevents a situation in which two control strings conduct a substantial current at the same time and thereby prevents a high power dissipation. When the instantaneous value of the rectified voltage increases further LED load LL3 and LED load LL4 subsequently become conductive. The pinching off mechanism also causes the current through transistor S2 and resistor Re2 to be reduced when LED load LL3 and transistor S3 start conducting and causes the current through transistor S3 and resistor Re3 to be reduced when LED load LL4 and transistor S4 start conducting. It has been found, however, that in dimmed operation, when the current flowing through the LED loads is much lower, the pinching off mechanism becomes less dependable, in other words the reduction of the current in a control string when the next control string starts conducting is by a smaller factor and power efficiency decreases. For this reason, the embodiment in FIG. 1 is equipped with additional voltage sensing circuits to control the flow of current through the control strings. These voltage sensing circuits operate as follows. When for instance LED load LL2 is conducting the voltage at the cathode of LED load LL2 is comparatively high. As a consequence the voltage across resistor R1" is also high so that transistor Q1 is rendered conductive and thus transistor S1 is rendered non-conductive. Similarly transistor S2 is rendered non-conductive when LED load LL3 starts conducting and transistor S3 is rendered non-conductive when LED load LL4 starts conducting.

When the instantaneous value of the rectified voltage reaches its maximum and starts to decrease, both the pinching off mechanism and the voltage sensing circuits ensure that the control strings conduct a current in an order that is reversed with respect to the order in which they carried a current when the instantaneous value of the rectified voltage increased. Also during a decrease of the instantaneous value of the rectified voltage only one control string conducts a current at any time. Just before the instantaneous value of the rectified AC voltage has decreased to a value that is too low to make a single LED load conduct a current the switch S is rendered conductive again so that the capacitor C1 can function as a temporary supply voltage source.

Since both the pinching off mechanism and the voltage sensing circuits control the flow of current through the control strings, this control was found to be very dependable and light flicker and power dissipation were avoided, also when the LED light source is in dimmed operation. Dimming of the LED light source shown in FIG. 1 can be achieved by adjusting the voltage present at the control electrodes of the transistors S1 to S4 via the global current control circuit.

Figure 2:
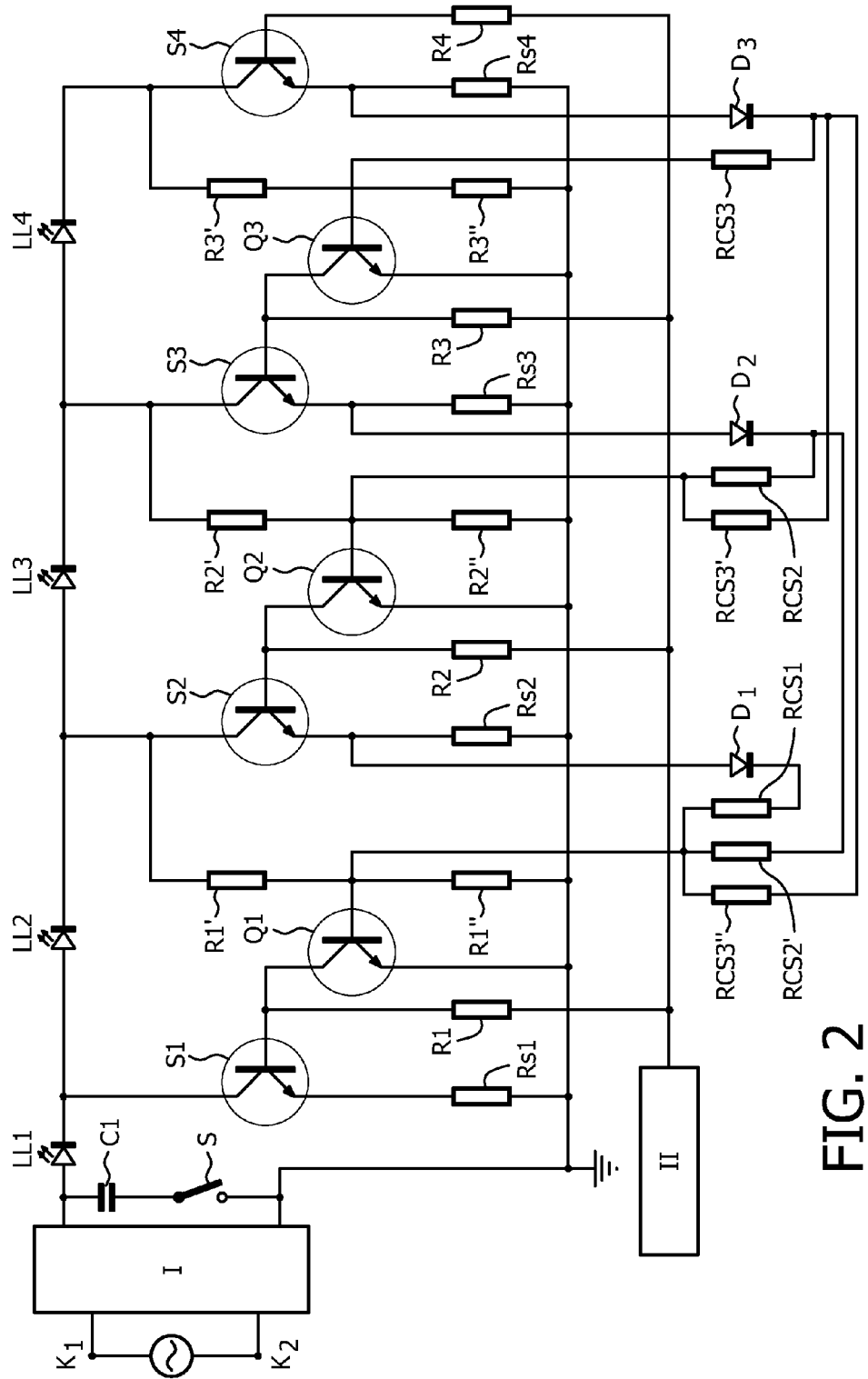
FIG. 2 shows another embodiment of a LED light source according to the invention.

In FIG. 2 components and circuit parts corresponding to similar components and circuit parts shown in FIG. 1 are labeled with the same references. The embodiment shown in FIG. 2 comprises 4 control strings, each comprising a transistor (S1-S4) and a resistor, like the embodiment in FIG. 1. However, in the embodiment shown in FIG. 2 the resistors are labeled Rs1-Rs4 and not arranged in series but are coupled between the transistors S1-S4 respectively and the second output terminal of rectifier I. The voltage sensing circuits are identical to the ones in the embodiment shown in FIG. 1. The same is true for the global current control circuit II, the rectifier I and the LED loads LL1-LL4. A first current sensing circuit is formed by diode D1, resistor Rcs1 and transistor Q1.

Diode D1 and resistor Rcs1 are coupled in series between a common terminal of transistor S2 and resistor Rs2 and the control electrode of transistor Q1. A second current sensing circuit is formed by diode D2, resistor Rcs2 and Rcs2' and transistor Q2. Diode D2 and resistor Rcs2 are coupled in series between a common terminal of transistor S3 and resistor Rs3 and the control electrode of transistor Q2. Diode D2 and resistor Rcs2' are coupled in series between a common terminal of transistor S3 and resistor Rs3 and the control electrode of transistor Q1. A third current sensing circuit is formed by diode D3, resistors Rcs3, Rcs3' and Rcs3" and transistor Q3. A series arrangement of diode D3 and resistor Rcs3 is coupled between a common terminal of transistor S4 and resistor Rs4 and the control electrode of transistor Q3. A series arrangement of diode D3 and resistor Rcs3' is coupled between a common terminal of transistor S4 and resistor Rs4 and the control electrode of transistor Q2, and a series arrangement of diode D3 and resistor Rcs3" is coupled between a common terminal of transistor S4 and resistor Rs4 and the control electrode of transistor Q1.

It is noted that in this embodiment transistors Q1, Q2, Q3 and Q4 are part of the voltage sensing circuits and also of the current sensing circuits.

The operation of the embodiment shown in FIG. 2 is as follows.

Most circuit parts of the embodiment shown in FIG. 2 function in the same way as in the embodiment shown in FIG. 1. The only circuit parts that are not comprised in the embodiment in FIG. 1 are the current sensing circuits and their operation is as follows. When the instantaneous value of the low frequency AC supply voltage increases and LED load LL2 and the second control string start conducting a current, the voltage across resistor Rs2 increases and via diode D1 and resistor Rcs1 transistor Q1 is switched on so that transistor S1 is switched off and the first control string thus no longer carries a current. When, due to a further increase of the instantaneous value of the low frequency AC voltage, LED load LL3 and the third control string start conducting a current, the voltage across resistor Rs3 increases and via diode D2 and resistor Rcs2 transistor Q2 is made conductive so that transistor S2 is switched off and the second control string thus no longer carries a current. Furthermore, via diode D2 and resistor Rcs2' transistor Q1 is maintained in a conductive state, so that the first control string remains non-conductive. When, caused by a further increase of the instantaneous value of the low frequency AC voltage, LED load LL4 and the fourth control string start conducting a current, the voltage across resistor Rs4 increases and via diode D3 and resistor Rcs3 transistor Q3 is switched on so that transistor S3 is switched off and the third control string thus no longer carries a current. Furthermore, via diode D3 and resistor Rcs3' transistor Q2 is maintained in a conductive state and via diode D3 and resistor Rcs3" transistor Q1 is also maintained in a conductive state so that the first control string and the second control string remain non-conductive.

When the instantaneous value of the low frequency AC supply voltage starts to decrease, the fourth LED load LL4 and the fourth control string stop conducting a current, the third, second and first control string are subsequently rendered conductive and the cycle described here-above is reversed. At any time the current through the control strings is controlled via both the voltage sensing circuits and the current sensing circuits. Also in the case of the embodiment shown in FIG. 2 this has resulted in a very dependable control, whereby light flickering and power dissipation are avoided, also in the case of dimmed operation.

In the embodiment shown in FIG. 1, when a further LED load and a further control string become conductive, the number of resistors in the current path of the current through the LED loads is decreased by one, so that the instantaneous value of the current is somewhat increased.

In other words, the more LED loads conduct a current, the higher this current is. In fact, in order to reduce light flicker, the opposite is required. Through modulating the voltage generated by the global current control circuit it is possible to counteract the increase of the current through the LED loads caused by current stacking, by making the current through the LED loads decrease when the amount of LED loads conducting a current increases. To this end the global current control circuit comprises a modulator.

Figure 3A:
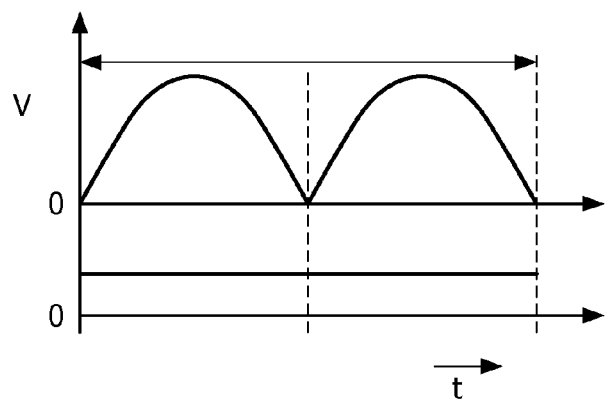
FIG. 3 illustrates the modulation of the current flowing through the LED loads in the embodiment shown in FIG. 1.
Figure 3B:
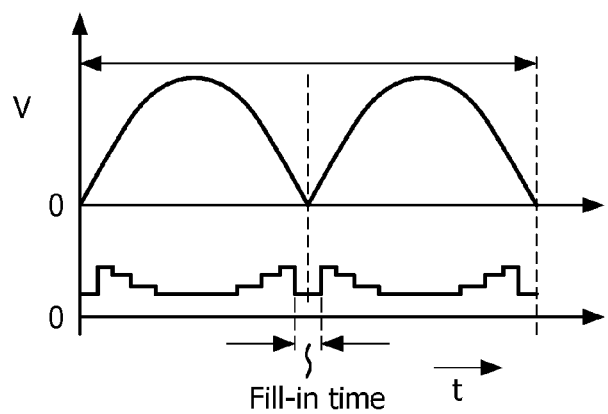
Figure 3C:
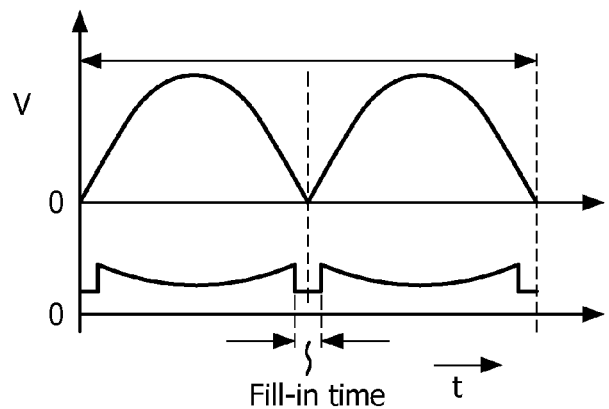

FIG. 3 illustrates the shape of the rectified low frequency AC supply voltage and the shape of the voltage generated by the global current control circuit present at the control electrodes of transistors S1 to S4, in the case that there is no modulation and the voltage is thus constant (FIG. 3a), in case there is a stepwise modulation (FIG. 3b) and in case there is a smooth modulation (FIG. 3c). In the latter two cases the modulation frequency is 2 f and the modulation is also in phase with the rectified AC voltage. It can also be seen that the modulation is such that the voltage at the control electrodes of the transistors is increased when the rectified AC voltage decreases and that the voltage at the control electrodes of the transistors is decreased when the rectified AC voltage increases. An exception is the voltage during the fill in time. As explained here-above, in case of the embodiment shown in FIG. 1, during the fill in time the capacitor C1 supplies all four LED loads. Consequently, during the fill in time the voltage generated by the global current control circuit has the same value as when the rectified AC voltage is very high.

The depth of modulation has influence on the light output flicker and on the power factor. It is generally designed in dependency of parameters such as the number of LED loads and LED load voltage etc. It can be chosen to fully compensate current stacking, or even overcompensate current stacking, so that the LED current is higher when only a single LED load carries a current than when three or four LED loads conduct a current.

The invention claimed is:

1. A LED light source comprising:
   a first input terminal and a second input terminal for connection to a supply voltage source supplying a low frequency AC supply voltage with frequency f,
   a rectifier coupled to the input terminals for rectifying the low frequency AC supply voltage,
   a series arrangement comprising N LED loads, a first and second end of said series arrangement being coupled to a first output terminal and a second output terminal of the rectifier,
   control circuitry for subsequently and sequentially making the LED loads conduct a current, one by one, in dependency of the instantaneous value of the low frequency AC supply voltage when the instantaneous value increases and for subsequently making the LED loads stop conducting a current, one by one, in dependency of the instantaneous value of the low frequency AC supply voltage when the instantaneous value decreases,
   wherein the control circuitry comprises
   N control strings, each control string comprising a controllable current regulator and each controllable current regulator being coupled between the cathode of a LED load and the second output terminal of the rectifier,
   current sensing circuitry for sensing the current in the last N−1 control strings and for decreasing the current in the first n control strings when the (n+1)th control string is conducting current, wherein 1≤n≤N−1
   N−1 voltage sensing circuits, coupled between the cathode of the (n+1)th LED load and the controllable current regulator comprised in the nth control string, for making the nth control string non-conductive when the voltage across the (n+1)th control string is higher than a reference value, wherein 1≤n≤N−1,
   a global current control circuit coupled to the controllable current regulators for controlling the instantaneous value of the current through the control strings, wherein
   each controllable current regulators comprise a series arrangement of a transistor and at least one impedance
   each controllable current regulator comprises an impedance that is not comprised in any of the other controllable current regulators; and
   the global current control circuit and the voltage sensing circuits are coupled to the control electrodes of the transistors comprised in the controllable current regulators.

2. The LED light source as claimed in claim 1, wherein the impedances in the control strings are comprised in a conductive path coupled between the transistor comprised in the first control string and the second output terminal of the rectifier.

3. The LED light source as claimed in claim 1, wherein the voltage sensing circuits each contain a further transistor.

4. The LED light source as claimed in claim 3, wherein the current sensing circuitry comprises N−1 current sensing circuits, the nth current sensing circuit being coupled to a common terminal of the transistor and the impedance comprised in the (n+1)th control string and coupled to control electrodes of the transistors in the first n control strings, and wherein 1≤n≤N−1.

5. The LED light source as claimed in claim 4, wherein the further transistors comprised in the voltage sensing circuits form also part of the N−1 current sensing circuits.

6. The LED light source as claimed in claim 1, wherein the global current control circuit comprises a modulator for modulating the current through the LED loads with a frequency 2f such that the instantaneous value of the current is decreased when the instantaneous value of the rectified low frequency AC supply voltage increases and the instantaneous value of the current is increased when the instantaneous value of the rectified low frequency AC supply voltage decreases.

7. The light source as claimed in claim 1, wherein the LED light source is dimmable by adjusting the voltage at the control electrodes of the transistors in the controllable current regulators via the global current control circuit.

8. The LED light source as claimed in claim 7, wherein the LED light source comprises a series arrangement of a switch and a capacitor coupled between the output terminals of the rectifier and control circuitry for rendering the switch conductive in case the instantaneous value of the low frequency AC supply voltage drops below a reference value.

9. The LED light source as claimed in claim 7, wherein the LED light source is suitable for operation with a phase cut dimmer, wherein the global current control circuit comprises circuitry for adjusting the voltage at the control electrodes of the transistors in the controllable current regulators in dependency of the adjusted phase angle of the phase cut dimmer.

10. A method of supplying a LED light source, the method comprising the steps of:
   providing a supply voltage source supplying a low frequency AC supply voltage with frequency f,
   rectifying the low frequency AC supply voltage,
   supplying the rectified AC supply voltage to a series arrangement of N LED loads, subsequently making the LED loads conduct a current, one by one, in dependency of the instantaneous value of the low frequency AC supply voltage when the instantaneous value increases and subsequently making the LED loads stop conducting a current, one by one, in dependency of the instantaneous value of the low frequency AC supply voltage when the instantaneous value decreases, by providing N control strings, each control string comprising a controllable current regulator and coupling each controllable current regulator between the cathode of a LED load and the second output terminal of the rectifier, sensing the voltages across the control strings, and rendering the transistor in the nth control string non-conductive when the voltage across the (n+1)th control string is higher than a reference value, wherein $1 \leq n \leq N-1$ sensing the current in the last N−1 control strings and decreasing the current in the first n control strings when the (n+1)th control string is conducting current, wherein $1 \leq n \leq N-1$ controlling the instantaneous value of the current through the control strings by controlling the voltages at the control electrodes of the transistors comprised in the control strings.

\* \* \* \* \*